(12) United States Patent
Pina et al.

(10) Patent No.: US 6,614,396 B2
(45) Date of Patent: Sep. 2, 2003

(54) METHOD AND DEVICE TO CORRECT A VARIATION IN BEARING MEASUREMENT

(75) Inventors: François Pina, Colombes (FR); Christophe Blouet, Puteaux (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/820,936

(22) Filed: Mar. 30, 2001

(65) Prior Publication Data

US 2002/0041203 A1 Apr. 11, 2002

(30) Foreign Application Priority Data

Mar. 31, 2000 (FR) .............................. 00 04134

(51) Int. Cl.[7] .............................................. G01S 1/44
(52) U.S. Cl. ....................................... 342/401; 342/442
(58) Field of Search ................................. 342/404, 401, 342/408, 398, 442

(56) References Cited

U.S. PATENT DOCUMENTS

| | | | | |
|---|---|---|---|---|
| 3,988,733 A | * | 10/1976 | Kohler | 342/442 |
| 4,104,637 A | | 8/1978 | Nielson | |
| 4,488,108 A | * | 12/1984 | Treise et al. | 324/76.82 |
| 4,495,473 A | | 1/1985 | Treise | |
| 4,604,717 A | * | 8/1986 | Kaplan | 342/387 |
| 4,876,549 A | * | 10/1989 | Masheff | 342/417 |
| 5,185,609 A | * | 2/1993 | DeBord | 342/401 |
| 6,313,795 B1 | * | 11/2001 | Herrmann et al. | 342/442 |

OTHER PUBLICATIONS

Matti Isohookana, et al. "Implementation of a VOR/ILS Precision Detector using the TMS32010 Digital Signal Processors," Proceedings of the European Signal Processing Conference, vol. Conf. 5, Sep. 18–21, 1990, pp. 1931–1934.

* cited by examiner

Primary Examiner—Gregory C. Issing
(74) Attorney, Agent, or Firm—Oblon, Spivak, McClelland, Maier & Neustadt, P.C.

(57) ABSTRACT

A method to correct the drift in the phase shift between first and second signals, the first and second signals generated by a signal having frequency Fe, the drift in the phase shift resulting from a drift in the frequency Fe, according to a given relationship. In one embodiment, the method includes the steps of (1) determining a value of the phase shift from a phase of the first signal and a phase of the second signal, (2) estimating the value of the frequency Fe, and (3) adjusting the phase shift to a value within an interval of angular values containing the angular value obtained for a reference value, using the phase shift, the estimated value of the frequency, and the given relationship.

14 Claims, 5 Drawing Sheets

METHOD AND DEVICE TO CORRECT A VARIATION IN BEARING MEASUREMENT

BACKGROUND OF THE INVENTION

1. Field of the Invention

The present invention relates to a method and device to correct the variation or drift of the phase difference $\Delta\Phi$ between two signals generated by a frequency signal $Fe=2\Phi\Omega$, a drift in the value of Fe prompting the drift in the value of the phase difference.

The invention can be applied especially to the correction of the drift in the value of the QDM (the code commonly used in navigation to designate the angle $\theta$ between a moving body and the magnetic north) in order to meet certain standards such as EUROCAE ED-22B, RTCA, ARINC MARK 2 AIRBORNE VOR RECEIVER 711-9. This drift results from a variation in the rotation frequency.

The invention can be applied for example but not exclusively, to air, sea or river navigation.

2. Description of the Prior Art

FIG. 1 shows the principle of operation of a system used, on board a moving body or aircraft, for example an aircraft, to determine the direction of this moving body at a given place, as seen from a radio beacon. A continuous wave is sent in a cardioidal radiation pattern rotating at 30 rpm. At the same time, an omnidirectional antenna sends a reference signal at 30 Hz with frequency modulation. The on-board receiver detects the amplitude modulation at 30 Hz caused by the rotation of the pattern and the reference signal. The azimuth of the receiver seen from the station or VOR beacon is equal to the phase shift between the two signals $E_1$ and $E_2$. $E_1$ is the modulation due to the rotation of the pattern and $E_2$ is the reference transmitted.

A variation in the 30 Hz frequency prompts a linear drift in the phase difference and the beat introduced into the signal as can be seen in FIGS. 2 and 3.

FIG. 4 is an exemplary processing chain according to the prior art.

A standard digital VOR receiver technique consists in applying a separator filter to process two frequency bands, the AM modulated low-frequency band and the FM modulated high-frequency band, applying a frequency discriminator to recover the FM modulating frequency and comparing the phases of the two signals.

The composite signal VOR, after reception by a receiver 10, is separated by means of a separator 11 into an AM modulated low-frequency signal (LF) and an FM modulated high-frequency signal (HF).

The low frequency signal (LF) is sent to a linear filter 12 and then sampled 13 in order to determine its phase $\Phi 1$ by means of a Fourier transform.

The high frequency signal (HF) is sent first of all to a non-linear filter 14 and then sampled 16 in order to determine its phase $\Phi 2$ in implementing a Fourier transform. The non-linear signal has a frequency discriminator 15 which, in particular, has the function of recovering the FM modulating frequency.

Using the two phases $\Phi 1$ and $\Phi 2$, the value of the phase shift $\Delta\Phi$ corresponding to the QDM (plus or minus the parameter of the phase-shift terms introduced by the filters) is determined for example by a computer programmed accordingly.

During the signal processing method, the operation of sampling the (LF) and (HF) signals by Fourier transform may generate spurious lines when the period of the analyzed signal is not a multiple of the temporal window of analysis.

To overcome this problem, there are known ways of using standard windows such as a generalized Hamming window to reduce the side lobes of the spectrum while widening the major lobe or the Kaiser lobe associating an infinite spectrum with a time signal with finite support. These two methods however have limited performance characteristics and disturb the signal-to-noise ratio for equal integration time.

It is also possible to use a DFT type filter bank method. In this case, the computation power needed is very great and leads to investment costs that are incompatible with certain applications.

FIG. 3 gives a view, in a referential system where the X-axis is the time axis and the Y-axis represents the drift in the QDM, of:

The curve (I) which corresponds to the value QDM(Fe) for the reference frequency Fe or the corresponding period $\Omega$.

The curve (II) which corresponds to the drift in the QDM and the curve (III) which corresponds to a beat prompted by the drift in the value of the reference frequency Fe.

Hereinafter in the description, the term QDM designates the angle taken with respect to the magnetic north, also known as the bearing.

The invention consists especially of the use of a relationship linking the drift in the QDM with a variation in the reference frequency and a frequency estimator carefully positioned in the processing chain to correct this drift.

It can also use a trapezoidal sampling window, for example to carry out the Fourier transform.

SUMMARY OF THE INVENTION

The invention relates to a method to correct the drift in the phase shift ($\Delta\Phi$, $\theta$) between two signals ($S_1$) and ($S_2$), said signals being generated by a signal having a reference frequency Fe or a corresponding period $\Omega$, the drift in the phase shift resulting from a drift in frequency Fe or in period depending on a given relationship $R((F,\Omega), (\theta, \Delta\Phi))$.

The invention comprises at least the following steps:

determining the value of the phase shift ($\Delta\Phi$, $\theta$) from the phase $\Phi 1$ of the signal $S_1$ and the phase $\Phi 2$ of the signal $S_2$, estimating $F_{est}$ the value of frequency Fe, or the corresponding period $\Omega$, bringing this value ($\Delta\Phi$, $\theta$) into an interval of given values [QDMmin, QDMmax] containing the value QDM(Fe) obtained for the reference value Fe taking account of the values $\Delta\Phi$ and $F_{est}$ and of the given relationship $R((F,\Omega), (\theta,\Delta\Phi))$.

According to one embodiment, the method comprises, for example, a step of processing by Fourier transform using a sampling window whose shape is substantially trapezoidal.

The invention also relates to a method to correct a drift in the phase shift ($\Delta\Phi$, $\theta$) between two signals, $S_1$ having a phase $\Phi 1$ and $S_2$ having a phase $\Phi 2$, the two signals being generated by a signal with a frequency Fe or with the corresponding period, the drift in the phase shift resulting from the drift in Fe or the drift in the period according to a given relationship $R((F,\Omega), (\theta, \Delta\Phi))$. The method comprises at least one step to determine at least one of the phases ($\Phi_1$, $\Phi_2$) by Fourier transform using a substantially trapezoidal sampling window.

The invention also relates to a device for the correction of the drift in the phase shift (ΔΦ,θ) between two signals ($S_1$) and ($S_2$), said signals being generated by a signal with a reference frequency Fe, the drift being linked to the drift in frequency Fe according to a given relationship R((F,Ω), (θ, ΔΦ)). The device comprises at least:

- a separator of the signals $S_1$ and $S_2$, means to determine the value of the phase Φ1 and Φ2 for each of the signals and means to determine the value of the phase shift ΔΦ,
- an estimator of the frequency Fe or of the corresponding period positioned after the separator,
- a device comprising, in memory, the relationship R((F,Ω), (θ, ΔΦ)) receiving the values ΔΦ and the estimated frequency or the estimated corresponding period, adapted to bringing the value of ΔΦ to a value within an interval of given values [QDMmin, QDMmax] containing the value QDM(Fe) obtained for the reference value Fe (or period).

According to one embodiment, the device comprises for example means to process the signals ($S_1$) and/or ($S_2$) by Fourier transform, the sampling window having a substantially trapezoidal shape.

The estimator to estimate the frequency value may be of the Prony's estimator type.

The invention also relates to a VOR receiver comprising a device for the correction of a drift in the phase shift (ΔΦ, θ) between two signals ($S_1$) and ($S_2$), said signals being generated by a signal having a reference frequency Fe, the drift being linked to the drift in frequency Fe or to the drift in period according to a given relationship R((F,Ω), (θ, ΔΦ)), comprising at least:

- a separator of the signals $S_1$ and $S_2$, means to determine the value of the phase Φ1 and Φ2 for each of the signals and means to determine the phase shift value ΔΦ,
- an estimator of the frequency Fe or of the corresponding period positioned after the separator,
- a device comprising, in memory, the relationship R((F,Ω), (θ, ΔΦ)) receiving the values ΔΦ and the estimated frequency or the estimated corresponding period, adapted to bringing the value of ΔΦ to a value within an interval of given values [QDMmin, QDMmax] containing the value QDM(Fe) obtained for the reference value Fe (or period).

The methods and devices according to the invention can be applied for example to reducing the variation of the QDM of a navigation system or radio navigation system.

The method and device according to the invention can be used especially to achieve compliance with stringent standards, such as RTCA and EUROCAE standards, or to approach them as closely as possible. The invention also improves the limit of detection as compared with the prior art devices.

BRIEF DESCRIPTION OF THE DRAWINGS

The invention will be understood more clearly from the following description, given by way of an illustration that in no way restricts the scope of the invention, of an example designed to reduce the variation in the QDM of a VOR radio navigation system where.

DESCRIPTION OF THE PREFERRED EMBODIMENTS

In order to obtain a clearer understanding of the principle implemented in the invention, the following description, given by way of an illustration that in no way restricts the scope of the invention, relates to the correction of the variation of the QDM in a system of navigation or radio navigation following a drift in the rotation frequency. This procedure can be used especially to meet the above-mentioned standards or to approach them to the utmost possible extent.

Without departing from the context of the invention, the different variants of implementation of the method and the device according to the invention can be applied advantageously to any system where a drift in the reference frequency (or in the corresponding period) will lead to a variation or a deviation of a phase difference ΔΦ between two signals.

Figure 5:
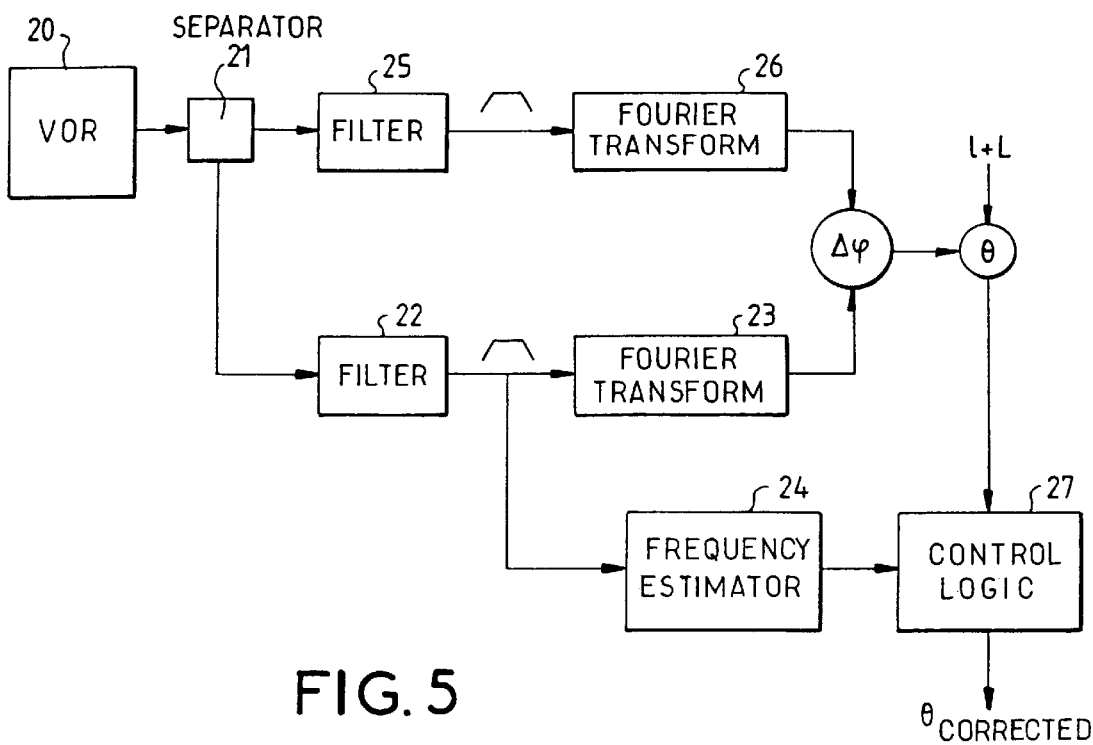
FIG. 5 shows an exemplary processing chain for the signal according to the invention, FIG. 6 gives a schematic view of the QDM obtained without the frequency estimator (prior art) or with the frequency estimator, FIG. 7 gives a schematic view of a window of analysis of the signal having a trapezoidal shape.

FIG. 5 gives a schematic view of an exemplary embodiment for the processing chain according to the invention.

The VOR modulation received by an aircraft is expressed by the following expression (1):

$$K_0 + k_3\cos(\omega t) + k_1 \cos(\Omega t - \theta) + k_2 \cos(332\ \Omega t - m\ \sin(\Omega t))$$

The composite VOR signal is received by a VOR receiver 20 according to a method known to those skilled in the art. It is then transmitted to a separator 21 so as to obtain a first low frequency (LF) signal $S_1$ corresponding to the reference frequency Fe, equal for example to 30 Hz, or to the corresponding period Ω and a second high frequency (HF) signal $S_2$.

The signal (LF) having a sinusoidal shape with a variable phase cos (Ωt −θ) is first of all filtered by a linear filter 22 and then sampled 23 by means of a microprocessor or a digital computer by implementation of a discrete Fourier transform or DFT to obtain the phase value Φ1 with, for example, Φ1=(Ωt −θ)−L, L being the delay introduced by the filter. A part of this signal is routed at output of the linear filter 22 towards a frequency estimator 24 in order to determine the estimated value $F_{est}$ of the reference frequency Fe or again the estimated value Ω est of the corresponding period Ω.

The linear filters are, for example, half-band filters introducing a constant phase shift. The filters as well as the separator are for example digital devices known to those skilled in the art.

The signal (HF) with a sinusoidal shape, modulated at 332 times the reference frequency Fe equal to 30 Hz and containing the reference phase (cos(332 Ωt−msin(Ωt)), is filtered through a non-linear filter 25 and then sampled by means of a Fourier transform 26 in order to obtain the phase value Φ2 corresponding to the value Ωt plus or minus the parameter I of the delay introduced by the discriminator, with Φ2=Ωt−I, for example.

Using the two values of the phases Φ1 and Φ2, the method determines the value of the phase shift ΔΦ, for example according to a computation known to those skilled in the art, implemented by means of a computer.

The processing chain also has a device 27 containing, in memory, the relationship R((F,Ω), (θ, ΔΦ)) linking the drift in bearing to the drift in the reference frequency or again to the drift in the corresponding period Ω. The control logic 27 receives the value of the estimated frequency $F_{est}$ or the value of the estimated period $Ω_{est}$ and the value of the bearing θ or of the phase shift ΔΦ, which makes it possible, on the basis of the relationship R((F,Ω), (θ, ΔΦ)), to bring the drift in angle (θ,ΔΦ) to a value within an interval of given values [QDMmin, QDMmax] containing, for example, the value QDM(Fe) obtained by the reference frequency Fe or around a given value such as the value QDM(Fe).

The value of the angle θ is computed, for example, from the value of the phase shift ΔΦ in correcting it by means of a value corresponding to the values of the delays L and I introduced by the linear and non-linear filters.

This correction can also be made after the drift in angle is brought to a value within the above-mentioned interval of given values.

Figure 1:
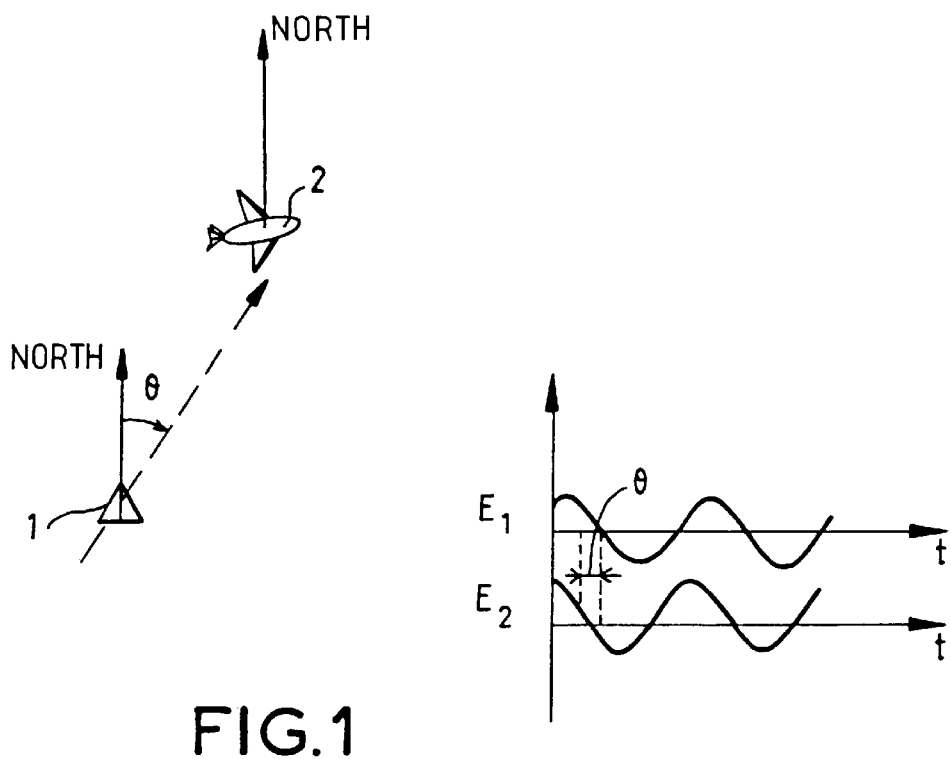
FIG. 1 shows the principle of operation in VOR mode.
Figure 2:
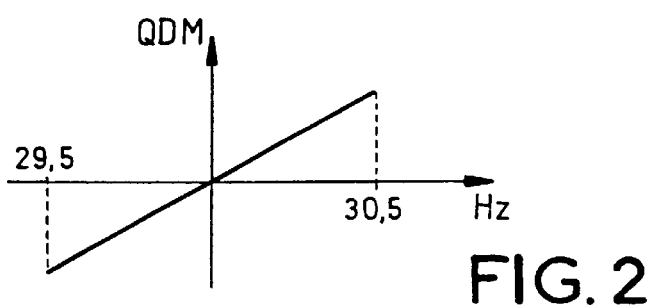
FIG. 2 shows a view, in a frequency-degree (radian) reference system, of the linear drift in the phase shift as a function of a frequency drift.
Figure 3:
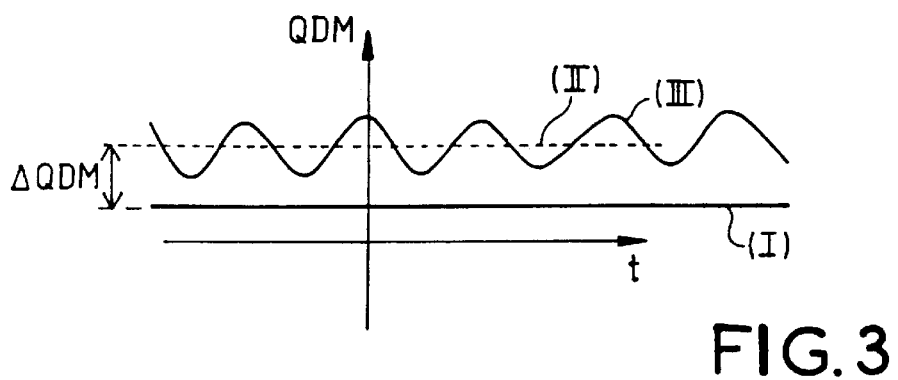
FIG. 3 shows the drift and the beat resulting from the drift in the frequency value (time-amplitude pattern in degrees of phase shift), FIG. 4 gives a schematic view of an exemplary processing chain for the signal received by the VOR according to the prior art.
Figure 4:
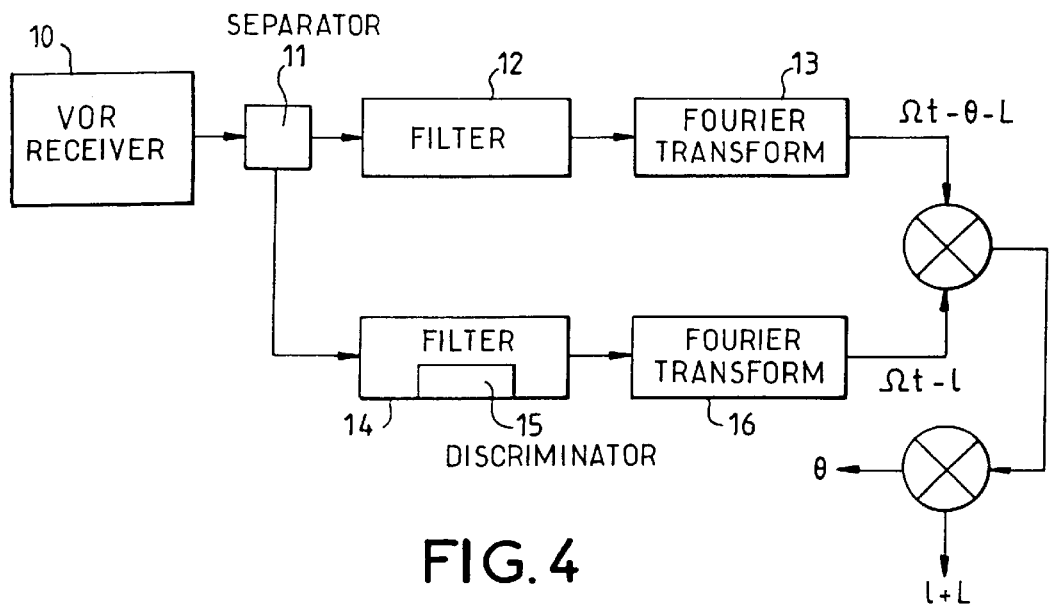

In this exemplary embodiment, the relationship R((F,Ω), (θ, ΔΦ)) linking the drift in the value of the reference frequency Fe and the drift of the value QDM is a linear relationship as described in FIG. 2. In this FIG. 2, the X-axis represents the value of the frequency F varying in an interval [29.5 Hz; 30.5 Hz] around the reference value Fe=30 Hz and the Y-axis represents the value of the drift in the QDM expressed in radians or in degrees.

The boundary values QDM max and QDM min are, for example, chosen as a function of the standard to be met, for example one of the standards referred to here above.

The relationship R((F,Ω), (θ, ΔΦ)) can be set up in the course of preliminary trials in which, for different frequency values varying around a given reference value Fe, the phase shift value is recorded in order to establish a database ((F, Ω), (ΔΦ, θ)).

The Fourier transforms, the computation of the phase shift as well as the correction in the value of the phase shift are achieved by example by means of a microprocessor or computer programmed according to a method known to those skilled in the art.

The frequency estimator 24 is positioned at the end of the processing chain, especially after the filter. This frequency estimator is for example a Prony's estimator described in the IEEE document Signal Processing Letters, Vol. 3, No. 2, February 1996 "Instantaneous Frequency Estimation Using Linear Prediction with Comparisons to the DESAs".

Figure 6:
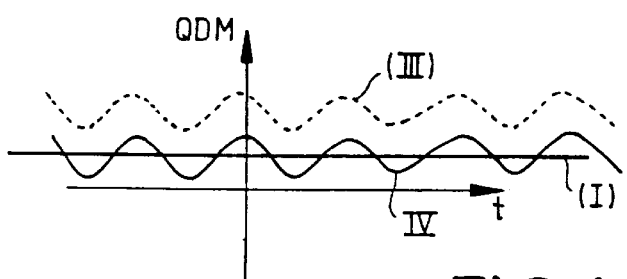

FIG. 6 shows a time-(degree or radian) pattern with the correction made in the value of the QDM in implementing the steps of the method according to the invention. The curve (III) corresponds to the value of the drift in QDM obtained without the use of a frequency estimator. It is brought (curve IV) towards the value of the QDM obtained for the reference value Fe represented by the straight line (I).

The digital example that follows is given for a reference signal Fe substantially equal to 30 Hz in the context of the VOR application.

In this case, the output of the linear filter 22 is a 30 Hz sinusoidal form for which the amplitude of the spectrum of the unwanted harmonics that compose it can be attenuated by an 8th-order Butterworth filter placed before the frequency estimator 24.

The VOR signal is sampled at 26 560 Hz and the input of the Butterworth filter is a sinusoidal form sampled at 207.5 Hz. Therefore, only seven samples represent a signal period. Among these seven samples, only four are used to estimate the frequency. The frequency or the period are generally estimated and a control logic corrects the QDM when it remains stable and within standards, for example (29.55 Hz; 30.45 Hz).

The experimental precision of the value of the estimated frequency is $10^{-4}$ without energy losses to eliminate static error.

By acting in this way, it is possible to comply with the standards described here above and to remain within the tolerance of variation in QDM of ±0.4° with respect to the value QDM(Fe) despite a variation in the frequency Fe=30 Hz of ±1.5%. This corresponds for example to an interval of values QDMmin=(QDM(Fe)−0.4°) and QDMmax=(QDM(Fe)+0.4°).

According to one mode of implementation of the method, the method uses a trapezoidal or substantially trapezoidal window to perform the Fourier transform of the signal in order to limit the initial phase and final phase effects in the spectral analysis. The amplitude of the signal is thus reduced linearly on the frequency period to be analyzed. The principle consists in bringing the frequency curves closer to each other at the position of the discontinuity in a sort of impossible curve.

Figure 7:
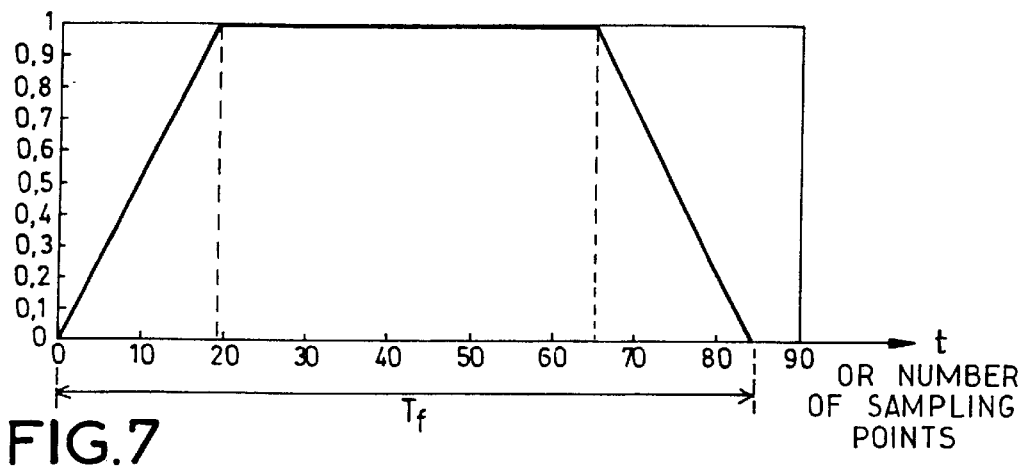

An exemplary trapezoidal window is shown in FIG. 7 in a standardized (time or number of samples)-amplitude diagram. It can be used to attenuate or erase the appearance of high frequencies due to the periodization when the signal is different from a multiple period of the window of analysis. The edges of the signal are attenuated at the beginning and/or at the end of the window of temporal analysis.

Figure 8:
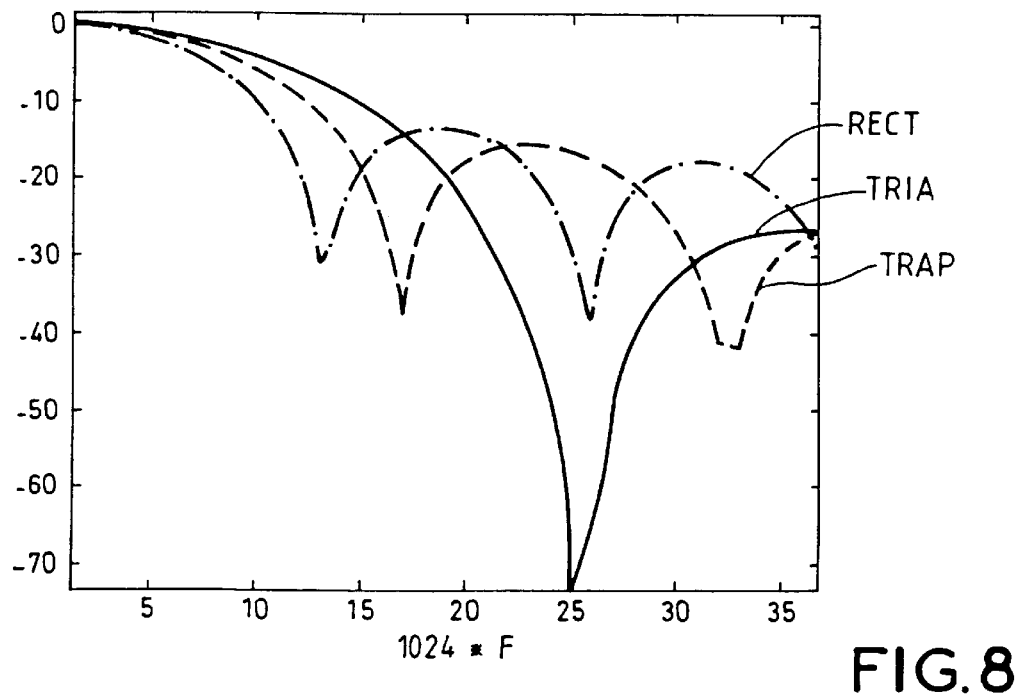
FIG. 8 shows the spectra expressed in dB for different sampling windows.

FIG. 8 has shown the spectrum expressed in dB respectively for a rectangular window (RECT), a triangular window (TRIA) and a trapezoidal window (TRAP) according to the invention.

This figure shows the small difference between the spectrum of the trapezoidal window and that of the rectangular window in terms of energy, width of the major lobe and width of the side lobe. The trapezoidal type window is used to approach the gain obtained by a rectangular type window.

The X-axis corresponds to the field of the frequencies and the Y-axis to the standardized amplitude of the lobe expressed in dB. The vertical axis corresponds to the middle of the lobe.

The conventional approach is to multiply the sample signal by a rectangular window which is the reference window. This approach has the drawback of bringing out anomalies in the signal or phase leap referenced 30 in FIGS. 9 and 10.

Figure 10:
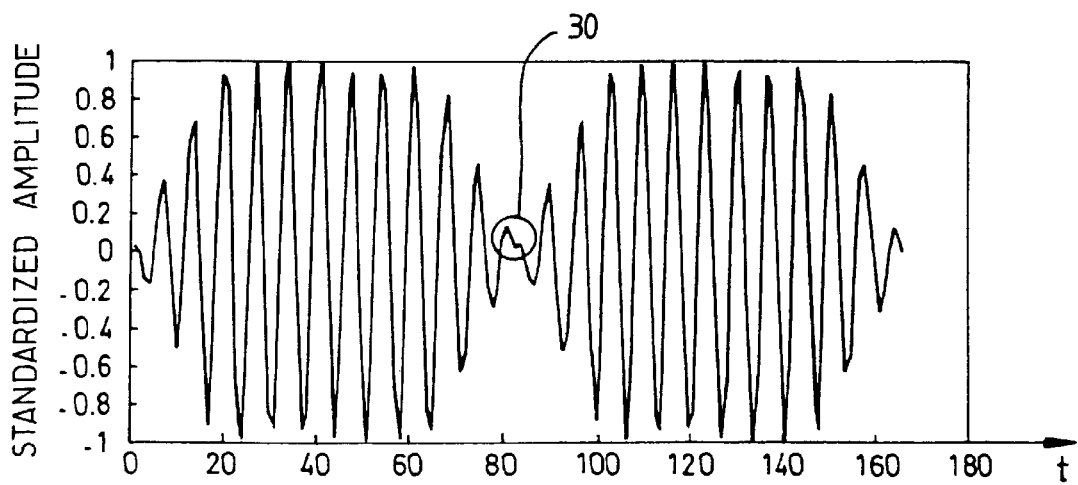

The use of a trapezoidal window as described in FIG. 7 attenuates this observed anomaly 30 as can be seen in FIG. 10.

Figure 9:
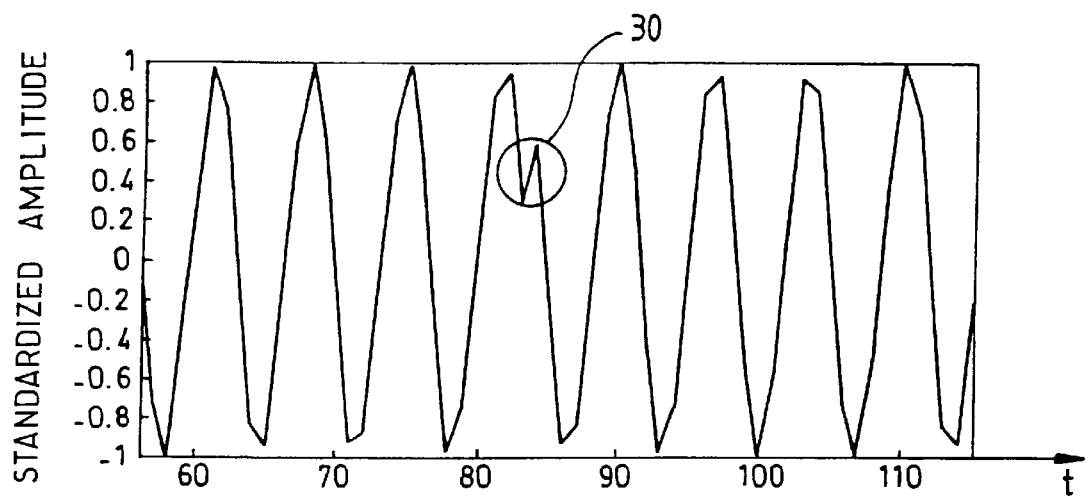
FIGS. 9 and 10 show the attenuation of the phase anomalies obtained in implementing the trapezoidal window.

In these two FIGS. 9 and 10, the X-axis corresponds to the time domain or to the number of sampling points at a given sampling frequency and the Y-axis to the amplitude of the standardized signal.

The parameters of the window, for example the time on which the window shows an attenuation at the beginning and at the end, is equal for example to 2.5 times the period of the signal to be sampled. The trapezoidal type of shape can be shown by means of two straight-line portions $D_1$ and $D_2$ connected by a straight line $D_3$, the slope of the straight lines $D_1$ and $D_2$ being computed to obtain the above-mentioned attenuation for example.

In the application to the correction of the value of the phase shift or QDM at the level of a VOR receiver, the energy is a major parameter because it directly conditions the sensitivity of the receiver. The choice of the sampling window results from a compromise by which it is possible to obtain high separating power for the window, minimize the loss of energy and obtain a high signal-to-noise ratio.

The use of a trapezoidal window also means that an initial offset can be applied to the amplitude (a sort of raised trapezoid) so as to reduce the energy loss to the minimum necessary.

Since this attenuation can reduce the total signal-to-noise ratio of the receiver, the goal is to minimize it in order to maintain the same integration time, compatible with the desired reception level on the one hand and the response time of the equipment on the other hand.

The following table brings together the characteristics of the different windows.

| Window | Side lobe (dB) | Width of the slope at 3 dB (BINS) | Coherent gain (standardized) energy loss |
|---|---|---|---|
| Rectangle | −13 | 0.89 | 1 |
| Triangle | −27 | 1.28 | 0.5 |
| Hamming | −43 | 1.30 | 0.54 |
| Hanning ($\alpha = 1$) | −23 | 1.64 | 0.64 |
| Gaussian ($\alpha = 2.5$) | −42 | 1.33 | 0.51 |
| Kaiser Bessel ($\alpha = 2.0$) | −46 | 1.43 | 0.49 |
| Tukey ($\alpha = 0.25$) | −14 | 1.01 | 0.88 |
| Trapezoid | −14 | 1.06 | 0.80 |

The analysis of this table shows that, in practice, apart from the Tukey windows, the energy loss is in the range of 3 dB.

Most of these windows may be likened to the Hamming window by modifying the parameters of the equation.

The aim is to minimize the Gibbs phenomena for all the derived windows of Hanning and optimize the time frequency product for the Gaussian windows.

Figure 11:
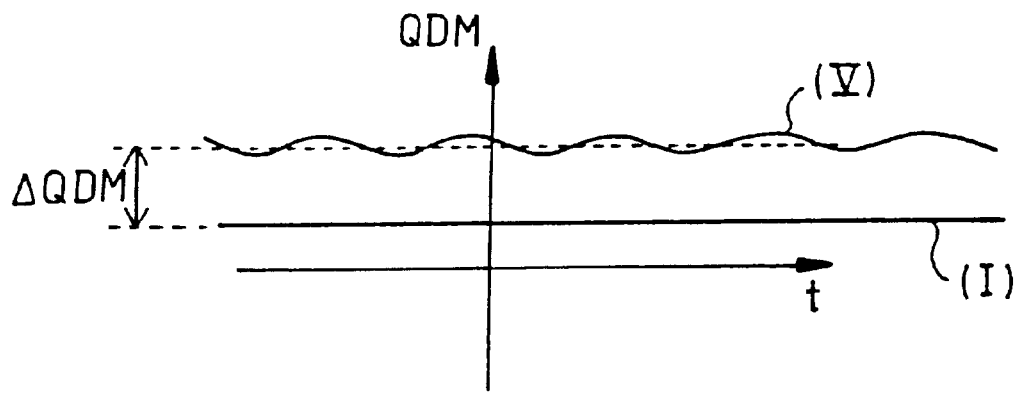
FIGS. 11 and 12 show the correction of the QDM obtained by implementing the method according to the invention.
Figure 12:
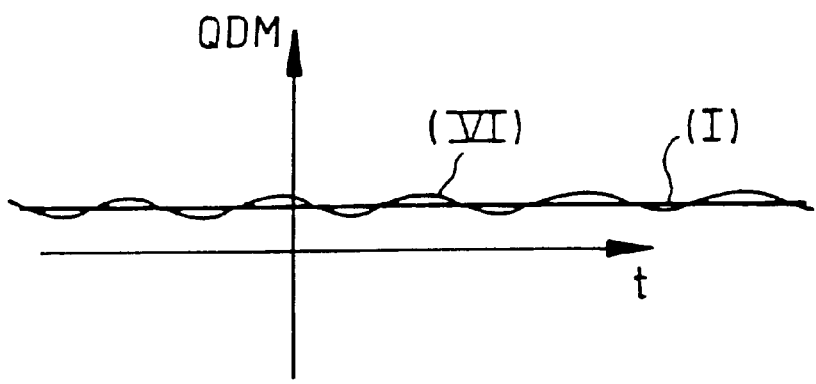

FIGS. 11 and 12 give a schematic view of the correction made in the value of QDM by applying the method according to the invention.

FIG. 11 shows the value of QDM obtained for a frequency value of 30.3 Hz using a trapezoidal window as described in FIG. 7 to carry out the Fourier transform in order to reduce the beat.

FIG. 12 shows the value of the QDM (VI) obtained for a frequency of 30.3 Hz by using a frequency estimator and a trapezoidal window for the Fourier transform.

What is claimed is:

1. A method to correct a drift in a phase shift between a first signal and a second signal, said first and second signals being detected by a same receiver and generated by a third signal having a frequency Fe and a corresponding period $\Omega$, the drift in the phase shift resulting from a drift in the frequency Fe, the method comprising:

determining the phase shift from a phase of the first signal and a phase of the second signal;

estimating a value of at least one of the frequency Fe and the corresponding period $\Omega$ of the third signal;

adjusting the phase shift to a value within a predetermined interval of angular values that includes a reference angular value $\Omega$ corresponding to a reference frequency, using (1) the phase shift, (2) the value estimated in the estimating step, and (3) a predetermined relationship between the drift in phase shift and the drift in the frequency Fe.

2. The method of claim 1, further comprising:

processing the first signal using a first Fourier transform having a first sampling window with a first trapezoidal shape; and processing the second signal using a second Fourier transform having a second sampling window with a second trapezoidal shape.

3. The method of claim 2, further comprising:

filtering the first signal by a linear filter prior to processing the first signal using the first Fourier transform, wherein the first signal is at least partly used to estimate at least one of the frequency Fe and the corresponding period $\Omega$ of the third signal; and filtering the second signal by a non-linear filter prior to processing the second signal using the second Fourier transform, wherein the reference frequency is equal to 30 Hz, and the first and second signals are low and high frequency signals, respectively.

4. The method of claim 3, further comprising:

providing, at a frequency of 30 Hz, a beginning attenuation time period and an ending attenuation time period, using at least one of the first trapezoidal shape and the second trapezoidal shape, wherein the beginning and ending attenuation time periods are at least 2.5 times a sampling period of a corresponding one of the first and second signals.

5. The method of claim 1, wherein the relationship is a linear function.

6. The method of claim 1, wherein the predetermined interval of angular values is bounded below by (Q−0.4°) and bounded above by (Q+0.4°), when the reference frequency is between 29.55 Hz and 30.45 Hz.

7. A method to correct a drift in a phase shift between a first signal having a first phase, and a second signal having a second phase, said first and second signals being detected by a same receiver and generated by a third signal with a frequency Fe and a corresponding period $\Omega$, the drift in the phase shift resulting from a drift in the frequency Fe, the method comprising:

determining at least one of the first phase and the second phase using a Fourier transform having a substantially trapezoidal sampling window.

8. A device configured to correct a drift in a phase shift between a first signal and a second signal, said first and second signals being detected by a same receiver and generated by a third signal with a frequency Fe and a corresponding period $\Omega$, the drift in the phase shift resulting from a drift in the frequency Fe:

a separator configured to separate the first signal and the second signal;

means for determining respective phases of the first signal and the second signal;

means for determining a phase shift between the first signal and the second signal;

an estimator configured to estimate a value of at least one of the frequency Fe and the corresponding period $\Omega$; and an adjuster configured to use (1) a predetermined relationship between the drift in phase shift and the drift in the frequency Fe, (2) the determined phase shift, and (3) the estimated value estimated by the estimator, to adjust the phase shift to a value within an interval of angular values that includes a reference angular value corresponding to a reference frequency.

9. The device of claim 8, further comprising:

first means for processing the first signal using a first Fourier transform having a first sampling window with a first trapezoidal shape; and second means for processing the second signal using a second Fourier transform having a second sampling window with a second trapezoidal shape.

10. The device of claim 9, further comprising:

a linear filter configured to filter the first signal prior to the first signal being applied to the first means for processing; and a non-linear filter configured to filter the second signal prior to the second signal being applied to the second means for processing.

11. The device of claim 8, wherein the estimator comprises a Prony estimator.

12. A Very High Frequency OMNI Ranging (VOR) receiver for correcting a drift in a phase shift between a first signal and a second signal, said first and second signals being detected by a same receiver and generated by a third signal having a frequency Fe and a corresponding period Ω, the drift in the phase shift resulting from a drift in the frequency Fe, the receiver comprising:

a separator configured to separate the first signal and the second signal;

means for determining respective phases of the first signal and the second signal;

means for determining a phase shift between the first signal and the second signal;

an estimator configured to estimate a value of at least one of the frequency Fe and the corresponding period Ω;

an adjuster configured to use (1) a predetermined relationship between the drift in phase shift and the drift in the frequency Fe, (2) the determined phase shift, and (3) the estimated value of the estimator, to adjust the phase shift to a value within an interval of angular values that includes a reference angular value corresponding to the reference frequency.

13. The VOR receiver of claim 12, further comprising:

first means for processing the first signal using a first Fourier transform having a first sampling window with a first trapezoidal shape; and second means for processing the second signal using a second Fourier transform having a second sampling window with a second trapezoidal shape.

14. The VOR receiver of claim 13, further comprising:

a linear filter configured to filter the first signal prior to the first signal applied to the first means for processing; and a non-linear filter configured to filter the second signal prior to the second signal being applied to the second means for processing.

* * * * *